United States Patent
Zucker

(10) Patent No.: US 6,742,096 B1
(45) Date of Patent: May 25, 2004

(54) FAST STARTUP PROCEDURE FOR MULTIMODE DATA PLAYERS AND/OR RECORDERS

(75) Inventor: Friedhelm Zucker, Villingen-Schwenningen (DE)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 09/346,229

(22) Filed: Jul. 1, 1999

(30) Foreign Application Priority Data

Jul. 3, 1998 (EP) .............................. 98401669

(51) Int. Cl.[7] .............................................. G06F 12/00
(52) U.S. Cl. ........................................ 711/170; 711/154
(58) Field of Search ............................. 711/172, 104, 711/170, 154

(56) References Cited

U.S. PATENT DOCUMENTS

| | | | |
|---|---|---|---|
| 4,989,195 A | 1/1991 | Suzuki | 369/50 |
| 5,155,719 A | 10/1992 | Masakawa | 369/48 |
| 5,506,986 A | * 4/1996 | Healy | 707/204 |
| 5,778,350 A | * 7/1998 | Adams et al. | 707/1 |
| 5,893,139 A | * 4/1999 | Kamiyama | 711/117 |

FOREIGN PATENT DOCUMENTS

EP    0817193 A2    1/1998

* cited by examiner

*Primary Examiner*—Matthew Kim
*Assistant Examiner*—Matthew D. Anderson
(74) *Attorney, Agent, or Firm*—Joseph S. Tripoli; Joseph J. Laks; Reitseng Lin

(57) ABSTRACT

A method of accelerating the identification of the type of data carrier when the data carrier is inserted in a multimode player and/or recorder which accepts different types of data carriers Looking up a table of use statistics allows the present method to determine which data carrier type is most often used, thus most probable to be encountered, and to select a parameter or a set of parameters associated with this type to test the data carrier.

6 Claims, 3 Drawing Sheets

| Nr. | type | use |
|---|---|---|
| 1. | T3 | U3 |
| 2. | T5 | U5 |
| 3. | T1 | U1 |
| 4. | T4 | U4 |
| 5. | T2 | U2 |

FIG. 3

FAST STARTUP PROCEDURE FOR MULTIMODE DATA PLAYERS AND/OR RECORDERS

BACKGROUND OF THE INVENTION

The present invention relates to data players and/or recorders which may read from and/or write on a plurality of types of data carriers.

A data player and/or recorder is a device which allows to read and/or write data using a data carrier. Typically the data carrier is removable from the player and/or recorder, i.e. other data carriers may be used with the same player and/or recorder device. Frequently a data carrier used is always of a same type. Examples for data carriers are vinyl records, magnetic tapes (with or without cassette), magnetic disks (Hard disks, Computer diskettes), optical disks (Compact Disks, CD-Recordable, CD-Rewritable, DVD, DVD-Recordable, DVD-Rewritable), magneto-optical media (tapes, disks, Minidisks) and others . . . . It may be that a player and/or recorder for a special type of magnetic diskettes only accepts this special type of diskette. However since the number of types of data carriers available increases in a relatively short period of time it is very an inconvenient that a type of data carrier becomes obsolete relatively fast due to an appearance of a more efficient type of data carrier. For this reason manufacturers of data players and/or recorders put effort into rendering their devices compatible with a plurality of types of data carriers. For example manufacturers of recent DVD-ROM drives have in many cases taken care that their drive may also make use of older types of CD-ROM, CD-R etc. . . . Data players and/or recorders which indifferently use different types of data carriers may be called multimode data players and/or recorders.

One problem encountered in multimode data players and/or recorders is a recognition of the type of data carrier introduced in it. Indeed a specific type of data carrier may require a specific number of adjustments of the player and/or recorder. For example these adjustments may concern a kind of data processing to use, or an intensity or a frequency of a light source used. Typically the player and/or recorder recognizes the type of data players by testing it, i.e., effecting a number of operations influenced by at least one adjustment parameters and validating the operation as being negative or positive. Each existing specific type of data carrier may be identified when a plurality of adjustment parameters which may belong to a specific set of adjustment parameters have been tested and validated as positive. The set of adjustment parameters may include a reflectivity measurement value of light reflected by the disk in case the type of data carrier is an optical disk because different types of optical disk have different reflectivity values.

It is known in multimode players and/or recorders to perform tests on the data carrier using at least one adjustment parameter and determining whether the data carrier may be associated to a specific set of adjustment parameters in order to identify the specific type of data carrier.

FIG. 1 illustrates in a column an example of 5 types T1 to T5 of data carriers which may be used in a multimode player and/or recorder. Each type is associated to a set of parameters represented in another column, respectively P1 to P5 for types T1 to T5 as is indicated using double arrows. The multimode player and/or recorder tests the data carrier by using at least one adjustment parameter at first, and possibly tests other adjustment parameters depending on a result of the test with the one parameter. This is done until a type may be identified which is associated to one of the sets of adjustment parameters P1, P2, . . . P5 which comprises all positively tested adjustment parameters. This way of testing and identifying the type of a data medium may appear to be relatively time consuming especially in case where the most frequently used type of data carrier is the one for which the adjustment parameters are tested last.

SUMMARY OF THE INVENTION

It is an object of the present invention to find a solution to render the testing and identifying of data carriers more efficient, e.g. less time consuming.

According to a first aspect of the present invention a solution is found in a method for identifying a type of a data carrier in a data player and/or recorder, a specific type of data carrier being associated to a specific set of adjustment parameters for the data player and/or recorder, comprising a testing of the data carrier using at least one adjustment parameter to determine whether the data carrier is associated to a specific set of adjustment parameters, identifying the data carrier as being of the specific type if the testing is positive. The method further comprises looking up use statistics of types in a hierarchical table of use statistics in order to pick a first type in the hierarchical table, selecting a parameter of the specific set of parameters associated to the first type.

In a second aspect of the present invention a solution is found in a method for identifying a type of a data carrier in a data player and/or recorder, a specific type of data carrier being associated to a specific set of adjustment parameters for the data player and/or recorder, comprising looking up use statistics of types in a hierarchical table of use statistics in order to pick a first type in the hierarchical table, selecting the specific set of parameters associated to the first type, testing of the data carrier using the specific set of parameters to determine whether the data carrier is associated to the specific set of parameters, and identifying the data carrier as being of the specific type if the testing is positive.

BRIEF DESCRIPTION OF THE DRAWINGS

In the following examples will be described of ways to carry out the invention referring to drawings, wherein FIG. 1 contains related columns with types and sets of parameters, FIG. 2 contains related columns with types and use statistics, FIG. 3 contains a ordered column of types, and FIG. 4 contains a flowchart illustrating a method according to the invention.

DESCRIPTION OF THE PREFERRED EMBODIMENTS

Throughout the following description same references will be used for designating same parts. It is understood that the described examples are given to illustrate the invention and are not limitative of the present invention. A person skilled in the art may well modify the described examples and remain in the scope of the claimed invention.

Figure 1:
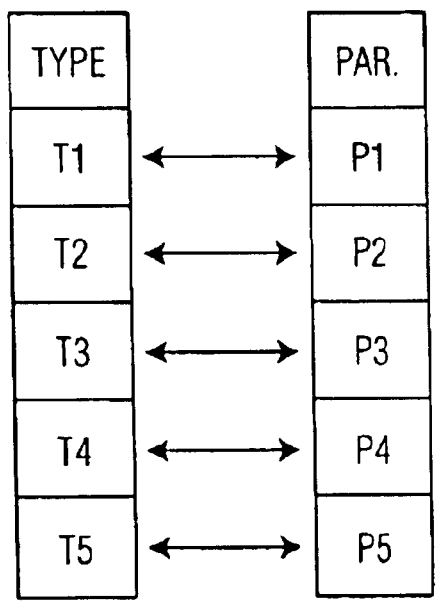

FIG. 1 contains types referenced T1 to T5 and described above in connection to an example of prior art.

Figure 2:
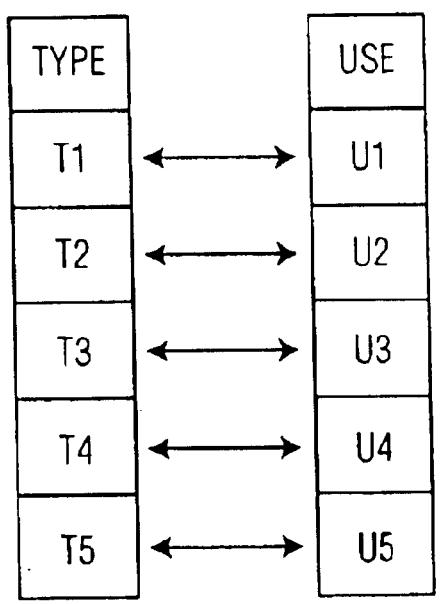

FIG. 2 contains a column of types T1 to T5 and a column of use statistics figures U1 to U5. Each use statistic figure U1 to U5 respectively is associated to a type T1 to T5. U1, U2 . . . , U5 may for example each be a number of times for which a data carrier of respectively type T1, T2 ..., T5 has been identified and perhaps used in the multimode data player and/or recorder.

The figures U1 and U5 may be ordered for example in a descending order of their respective values. Thus if

Figure 3:
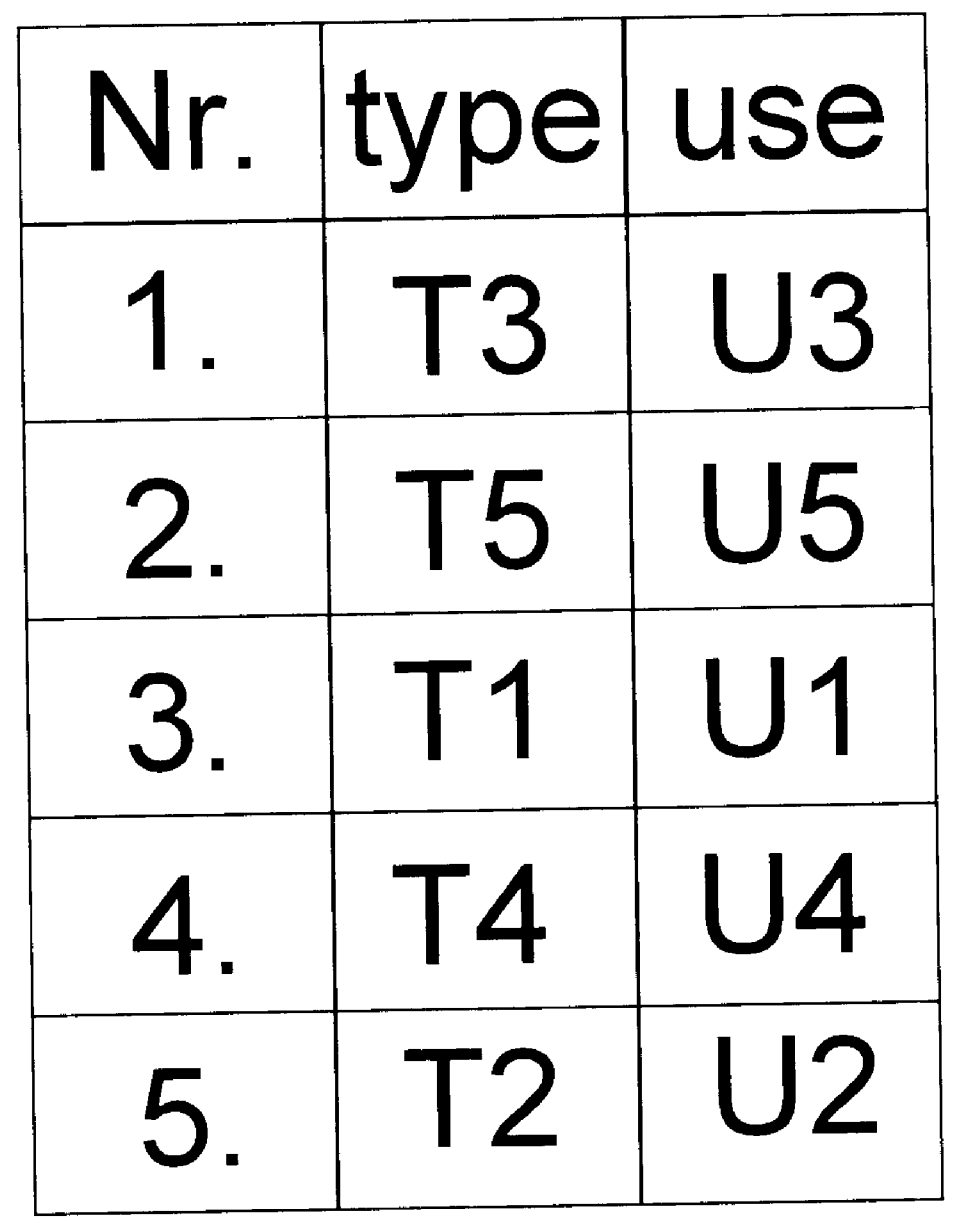

U3>U5>U1>U4>U2 meaning that a data carrier of type T3 has been used in the multimode data player and/or recorder most often, and the type T1 more often than the type T4, then an ordered hierarchical list of the types may be obtained as shown in FIG. 3. The column shown in FIG. 3 illustrates in line Nr 1 the most frequently used type of data carrier with its use statistic figure and in line Nr 5 the less frequently used type of data carrier. For the multimode data player and/or recorder this means that the probability that the next data carrier to test and identify be of the type in line 1, i.e., T3, is highest, as opposed to the type in line 5, i.e., T2, for which the probability is lowest.

Figure 4:
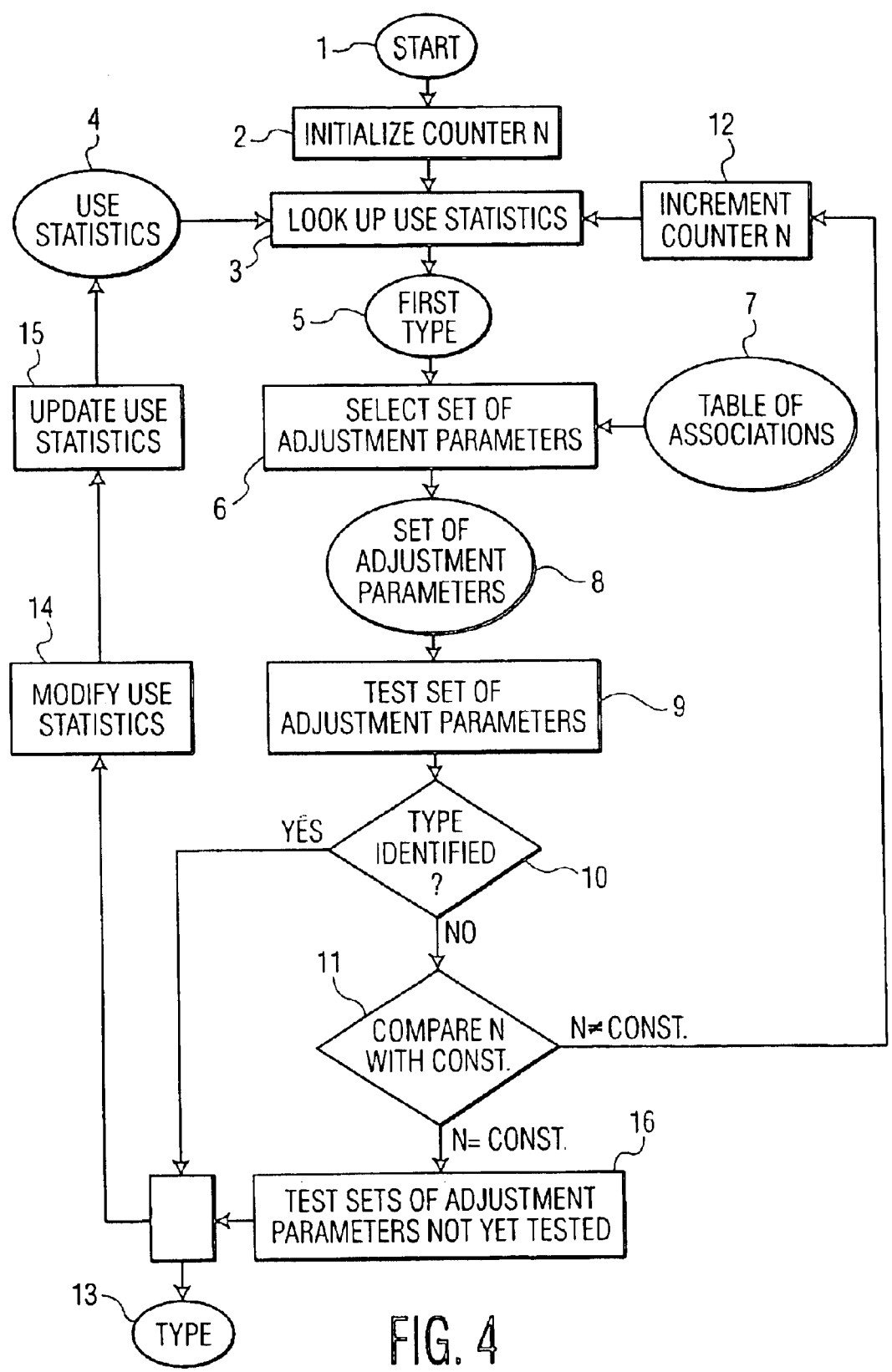

In the flowchart of FIG. 4 a start 1 causes an initialization 2 of a counter N by assigning a value 1 to N. Subsequently a looking up 3 of use statistics 4 is done. The use statistics 4 may for example be the hierarchical ordered table shown in FIG. 3. The looking up 3 delivers a first type, e.g. T3 picked from the first line of the table. A selecting 6 selects a specific set of parameters 8 for the first type using a table of associations 7, which to each type associates a set of parameters. This table of associations may for example be the associated columns illustrated in FIG. 1, in which case the selecting 7 selects the set of parameters P3 for the first type T3.

A testing 9 uses the specific set of parameters 8 to determine whether the data carrier is associated with it. If the data carrier is associated with the set of parameters then the type of the data carrier is identified. A case study 10 checks whether the type is identified and if this is not the case the counter N is compared to a determined constant number in case study 11. The case study 11 is optional and allows to limit a number of loops in which the data carrier is tested. If N is not equal to the determined constant number the counter N is incremented in 12 by assigning N=N+1, and the looking up 3 started again.

In a preferred embodiment (not shown) of the example illustrated in FIG. 4, the selecting 6 selects at least one parameter for the first type, this one parameter being associated to the first type. The testing 9 then uses the one parameter to determine whether the data carrier is associated with it. However the one parameter may be associated to a plurality of other types than the first type. Therefore another parameter associated to the first type may be selected and the data carrier tested with this other parameter to further differentiate and eventually identify the type of data carrier.

If the case study 10 reveals that the type of the data carrier is identified then the method ends delivering the type of the data carrier in 13. Optionally the use statistic figures are modified in 14, taking into account the identified type, and the ordered hierarchical list 4 is updated in 15. For example if the type T3 is identified, the value of U3 may be modified by incrementing.

If the case study 11 reveals that the value of counter N is equal to the determined constant number then an optional testing of sets of parameters which have not yet been tested may be tested in 16. This testing may for example be done as is known from prior art. Eventually the type of the data carrier 13 is delivered and the updating 14 may be done.

In a preferred embodiment a storing allows to store the use statistics in a non volatile memory, i.e., a memory which allows to recover the use statistics even after power needed to run the data player and/or recorder has been interrupted. The non volatile memory may for example be a semiconductor memory. The non volatile memory may in another example also be a recordable data carrier such as a magnetic hard disk. The latter example is particularly advantageous when the multimode data player and/or recorder is used together with a computer which in most cases also comprises a magnetic hard disk to store data.

The example described and variations thereof, which remain in the scope of the claimed invention may find a use an optical disk drive, for example CD-ROM or DVD-ROM/RAM drives. If for example a DVD-ROM drive is mainly used to read and write a CD-R data carrier, then at insertion of the data carrier in the drive or at power up of the drive this is the first type of data carrier to be tested for even before testing the DVD-ROM type of data carrier. As a consequence a waiting time at insertion of the data carrier in the drive is reduced and effective reading and/or writing with the data carrier may be undertaken more rapidly than with drives known out of prior art. The waiting time may for example be reduced by 20 seconds or more.

What is claimed is:

1. A method for identifying a type of data carrier inserted in a multimode data player and/or recorder, a specific type of data carrier being associated with a specific set of a variety of adjustment parameters for adjusting the data player and/or recorder to the specific type of data carrier, comprising the steps of:

identifying the type of data carrier by testing of the data carrier using at least one adjustment parameter of the variety of adjustment parameters to determine whether the data carrier is associated with the specific set of the variety of adjustment parameters for identifying the data carrier if the testing is positive, looking up use statistics of types of data carriers in a hierarchical table of use statistics of types of data carriers in order to pick a first type of data carrier in the hierarchical table, the first type of data carrier being picked according to its position in the hierarchical table, and selecting at least one adjustment parameter of the specific set of the variety of adjustment parameters associated with the first type of data carrier.

2. A method for identifying a type of a data carrier inserted in a multimode data player and/or recorder, a specific type of data carrier being associated with a specific set of a variety of adjustment parameters for adjusting the data player and/or recorder, comprising the steps of:

identifying the type of data carrier by looking up use statistics of types of data carriers in a hierarchical table of use statistics of types of data carriers in order to pick a first type of data carrier in the hierarchical table, the first type of data carrier being picked according to its position in the hierarchical table, selecting the specific set of a the variety of adjustment parameters associated with the first type of data carrier, testing of the data carrier using the specific set of the variety of adjustment parameters to determine whether the data carrier is associated with the specific set of the variety of adjustment parameters, and identifying the data carrier as being of the specific type of data carrier if the testing is positive.

3. A method according to claim 1, further comprising the step of modifying the use statistics of types of data carriers and updating the hierarchical table using modified use statistics of types of data carriers.

4. A method according to claim 3, further comprising the step of storing the use statistics of types of data carriers in a non volatile memory.

5. A method according to claim 2, further comprising the step of modifying the use statistics of types of data carriers and updating the hierarchical table using modified use statistics of types of data carriers.

6. A method according to claim 5, further comprising the step of storing the use statistics of types of data carriers in a non volatile memory.

\* \* \* \* \*